March 20, 1956 R. F. BOWES 2,738,763
DISPOSABLE DROPPING BOARD COVER FOR CAGES
Filed Oct. 1, 1953 3 Sheets-Sheet 1
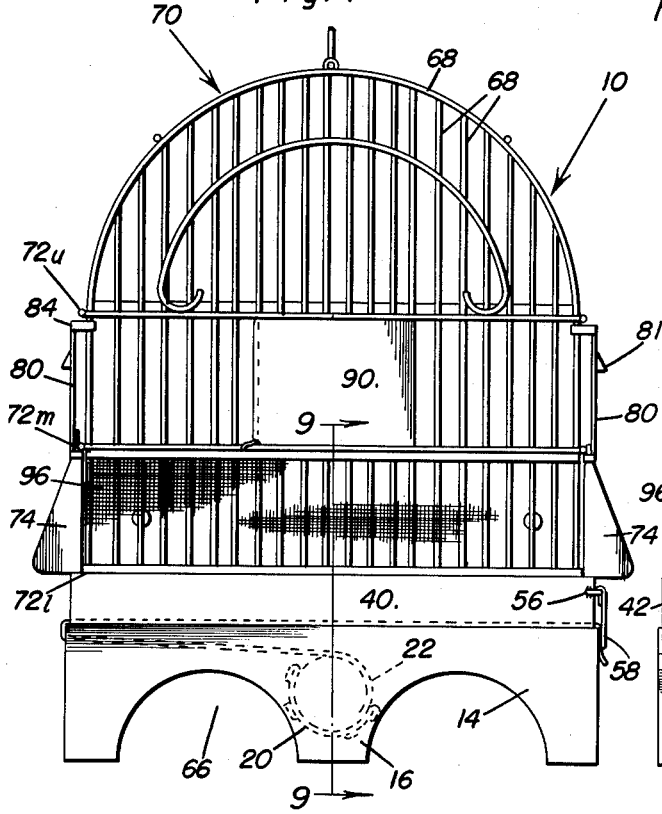
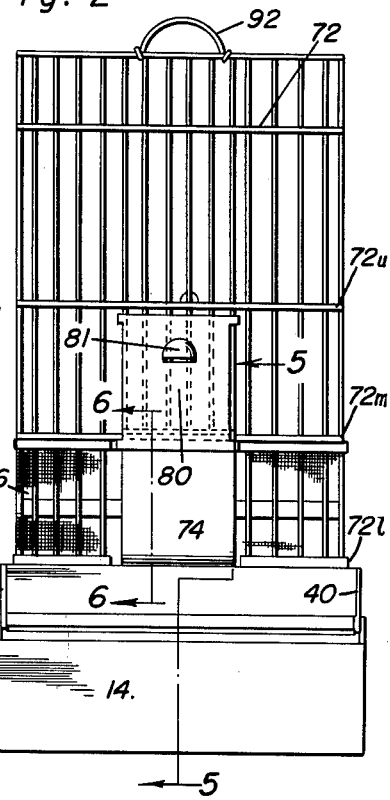
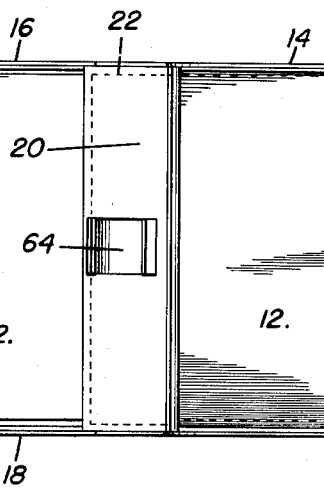
Ralph F. Bowes
INVENTOR.

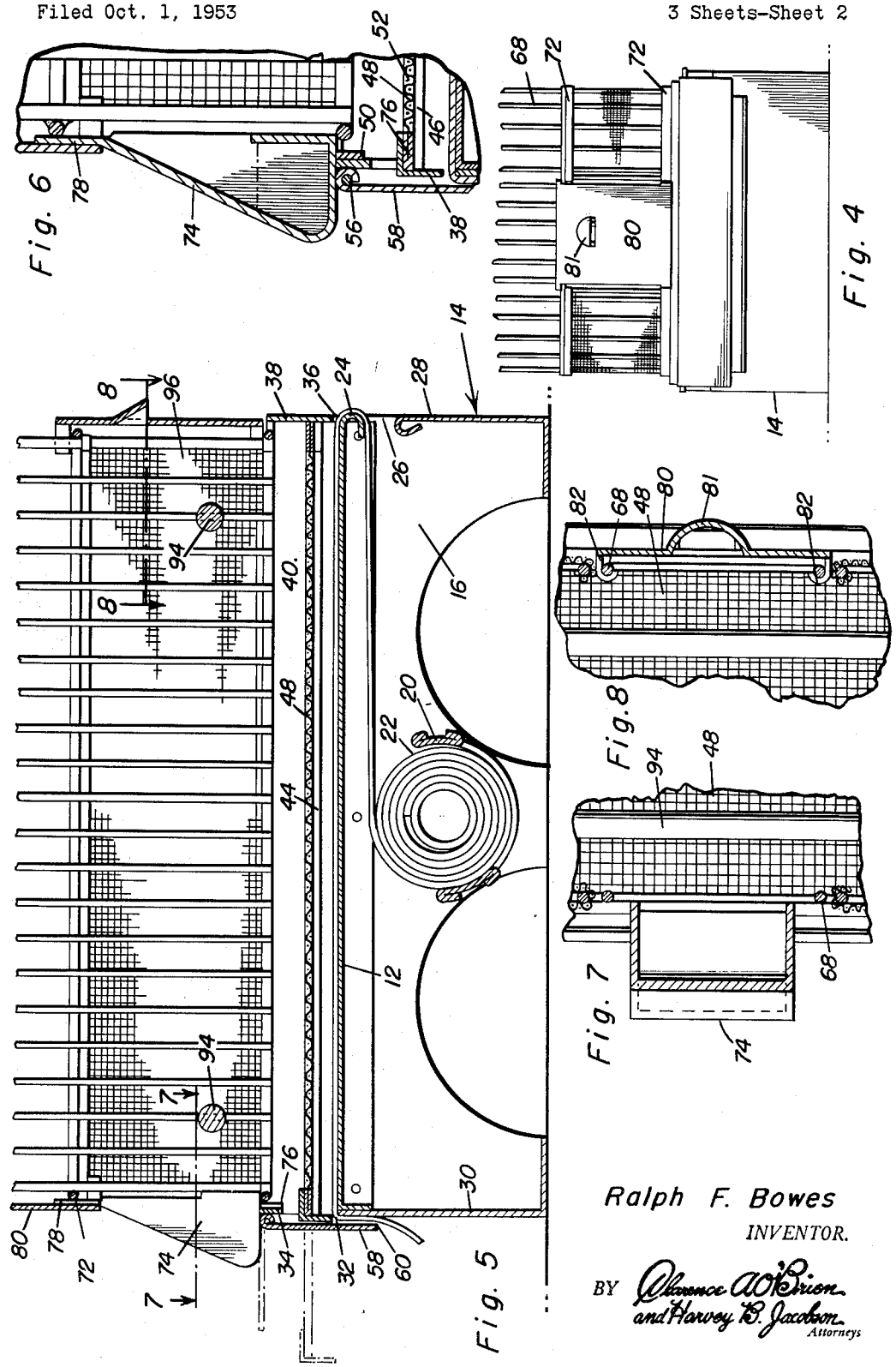

March 20, 1956  R. F. BOWES  2,738,763
DISPOSABLE DROPPING BOARD COVER FOR CAGES
Filed Oct. 1, 1953  3 Sheets-Sheet 3
Fig. 9
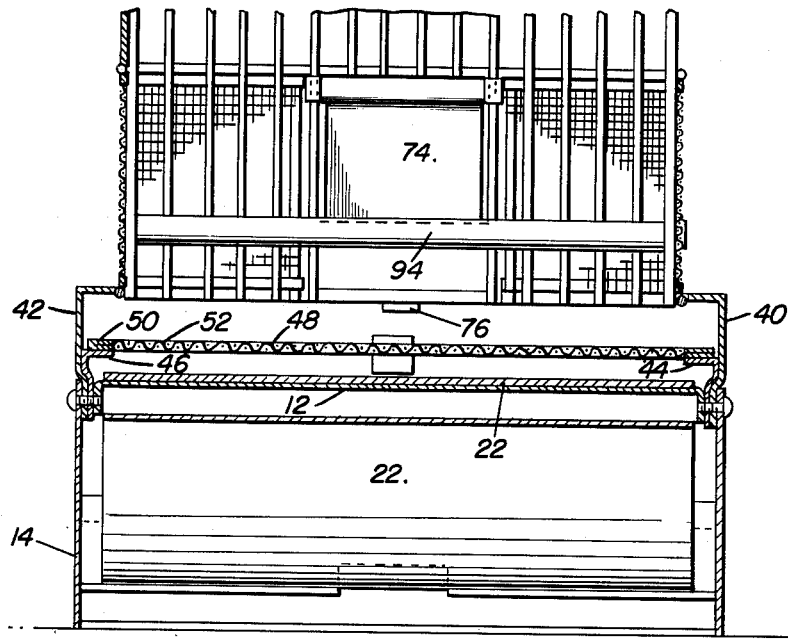
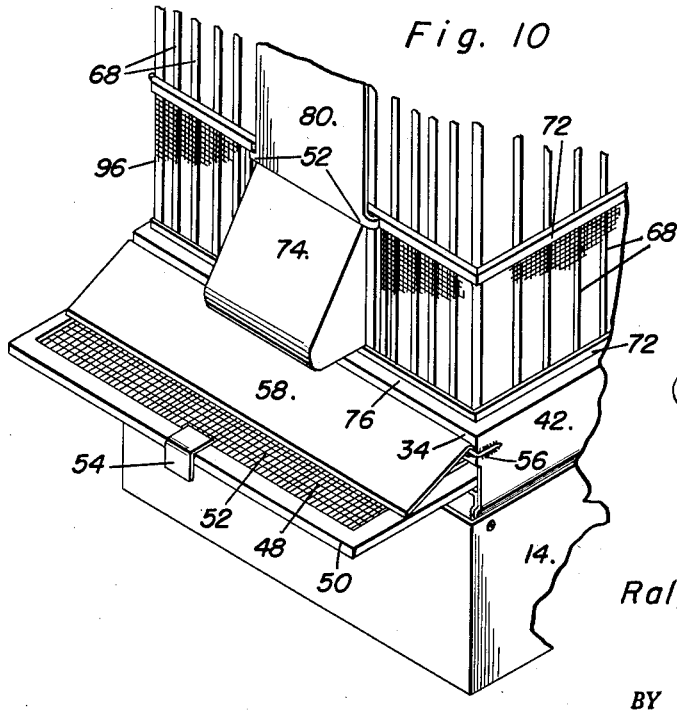
Fig. 10
Fig. 11
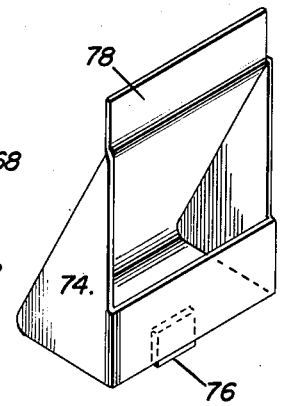
Ralph F. Bowes
INVENTOR.
BY Clarence A. O'Brien
and Harvey B. Jacobson
Attorneys United States Patent Office 2,738,763
Patented Mar. 20, 1956

2,738,763
DISPOSABLE DROPPING BOARD COVER FOR CAGES

Ralph F. Bowes, Pensacola, Fla.

Application October 1, 1953, Serial No. 383,496

3 Claims. (Cl. 119—17)

This invention relates to new and useful improvements in bird cages, and more particularly, to improved means for maintaining various types of birds in a sanitary and secure manner.

The primary object of this present invention resides in the provision of a bird cage which incorporates means for enabling the bird cage to be periodically cleaned in a more convenient manner, utilizing a continuous roll of covering material for the bottom plate of the bird cage. A drawboard of suitable foraminous material is utilized to prevent the tearing of the covering material by the birds contained within the cage.

The construction of this invention features an arcuate substantially semi-cylindrical tray which is positioned beneath the bottom plate of the bird cage in such manner that a roll of covering material may be freely received therein. The covering material may then be entrained beneath the drawboard of the bird cage in a simple and convenient manner. Means are also provided for enabling the sheet of covering material to be easily and accurately cut, as may be desired. The means for cutting the sheet of material also provides means for covering the slot through which the drawboard may be removed, and for covering the free end of the covering material.

Another feature of the invention resides in a novel feed trough and closure plate incorporated therewith, which closure plate will automatically slide in place covering the feed openings in the bird cage when the feed troughs are removed, thereby preventing accidental escape of the birds contained within the cage. The only external force needed to ensure that the closure plate will properly seat is the force of gravity, thereby eliminating the danger of an oversight by the caretaker of the birds when the feed trough is removed. This will ensure against the accidental or unintentional escape of the birds.

Still further objects and features of this invention reside in the provision of a bird cage that is strong and durable, simple in construction and manufacture, capable of being readily constructed out of conventional materials, and in such shapes and designs as may be desired, which eliminates the necessity for rollers and the like on which rolls of covering material had heretofore been required to have been positioned or placed, and which bird cage is relatively inexpensive to produce and convenient to utilize.

These, together with the various ancillary objects and features of the invention which will become apparent as the following description proceeds, are attained by this novel bird cage, an embodiment of which has been illustrated in the accompanying drawings, by way of example only, wherein:

Figure 1 is a side elevational view of the bird cage comprising the present invention;

Figure 2 is a left end elevational view illustrating the relative arrangement of parts of that portion of the bird cage;

Figure 3 is a bottom plan view of the bird cage;

Figure 4 is a fragmentary right end elevational view;

Figure 5 is an enlarged vertical sectional detail view, as taken along the plane of line 5—5 in Figure 2;

Figure 6 is a vertical sectional detail view, as taken along the plane of line 6—6 in Figure 2, and illustrating the construction of the feed trough in detail;

Figure 7 is a horizontal sectional view, as taken along the plane of line 7—7 in Figure 5;

Figure 8 is a sectional detail view, as taken along the plane of line 8—8 in Figure 5;

Figure 9 is a vertical sectional detail view, as taken along the plane of line 9—9 in Figure 1, and illustrating the relative arrangement of the roll of disposable material and its relation with the other elements of the invention;

Figure 10 is a partial perspective view, illustrating the manner in which the drawboard may be removed from the cage, and further illustrating the means utilized to cut the free end of the roll of disposable material, as may be desired; and Figure 11 is a perspective view illustrating the construction of one of the feed troughs.

With continuing reference to the accompanying drawings, wherein like reference numerals designate similar parts throughout the various views, reference numeral 10 is used to generally designate the bird cage comprising the present invention. The bird cage 10 includes a base plate 12 which is supported by a peripherally extending base 14 of any suitable ornamental appearance. The base 14 extends downwardly from the bottom plate 12 and extending between the side portions 16 and 18 of the base in a substantially semi-cylindrical arcuate tray 20. The tray 20 is adapted to receive a roll of disposable material, such as wax paper or the like, as generally indicated by reference numeral 22, therein. The free end of the roll of material 22 is adapted to be entrained about an arcuate edge 24 of the end portions of the base 14 formed by a slot 26 cut in the end 28 of the base. The other end 30 of the base is substantially imperforate. The free end of the disposable material 22 is positioned so as to overlie the bottom plate 12, and extends outwardly through a slot 32 in the end wall 34 of the bird cage 10. The free end of the disposable material 22 also extends through a slot 36 in the end wall 38 of the bird cage.

Extending upwardly from the bottom plate 12 are spaced side walls 40 and 42. Attached to the side walls 40 and 42 are inwardly extending spaced flanges 44 and 46 on which there is slidably removably positioned a drawboard 48 provided with a peripheral frame 50 about a sheet 52 of foraminous material of a mesh determined by the size of the birds to be domiciled in the cage. The drawboard 48 is provided with a handle 54 for more conveniently enabling such to be withdrawn from within the bird cage 10. Hingedly secured to the end wall 34 of the bird cage 10 by means of a hinge rod 56 is a plate 58 which also forms an edge, as at 60, for cutting the roll of disposable material at the free end thereof, as may be desired.

It is to be noted that the semi-cylindrical tray 20 for the roll 22 of disposable material is provided with an aperture 64 therethrough which can be utilized for access to the roll 22 when the bird cage is seated on a suitable supporting surface with birds living therein. Obviously, suitable recesses, such as indicated at 66, are formed in the base 14.

The end walls 34 and 38, together with the side walls 40 and 42, are formed in their lower sections from suitable panels of imperforate material. The upper portions of the side and end walls, respectively, are formed from vertically extending rods, such as those indicated by reference numeral 68. As can be readily seen from an inspection of Figure 2, the rods 68 forming the end walls are, in fact, of a substantially inverted U-shape to form an arcuate top 70 for the bird cage. The vertically extending rods 68 are held in spaced relationship by suitable spaced horizontal rods 72.

One of the important features of the invention resides in the method and means of retaining the occupants of the cage inside when the feed troughs, such as those designated by reference numeral 74, are removed therefrom. These feed troughs 74 include downwardly extending members 76 adapted to seat within a slot in the peripheral walls, indicated at 77, of the end panels of the end walls 34 and 38. The feed troughs are adapted to receive food or water for the birds, and include an upwardly extending flanged portion 78. The feed troughs 74 are held in their supported position by means of a closure plate 80 having a pair of lower arcuate-shaped ears 82 attached thereto, and likewise having a pair of upper arcuate ears 84. The ears 82 and 84 are slidably secured on the vertically extending rods 68 adjacent the openings in the end walls 34 and 38 formed by the termination of certain of the rods 68 at an intermediate horizontal rod, as indicated by the reference numeral 72m. This intermediate rod is positioned between an upper horizontal rod, designated by reference numeral 72u, and a lower horizontal rod, as designated by the reference numeral 72l. The lower ears are engaged about the rods 68 below the horizontal extending intermediate rod 72m. Inasmuch as the feed troughs 74 have an outwardly sloping outer surface, the closure plates 80 are prevented from assuming a lowered position until the force of gravity acts thereon to drop the plates 80 after the feed troughs 74 have been removed. The uppermost position of the closure plates 80 is limited by the position of the intermediate horizontal extending rod 72m, while the lower position thereof is limited by the contact of the ears 82 with the lower horizontal rod 72l. Thus, the closure plates 80, by their wrap-around engagement of the ears 84 and 82 with the vertically extending rods 68 provide a ready means for closing the openings for the feed troughs 74 immediately upon the removal of the feed troughs. Of course, enough free play is incoporated between the feed troughs 74 and the closure plates 80 to permit the ready removal of the feed troughs 74.

There is provided, of course, a door 90 for access to the bird cage, and a member 92 is attached to the upper portion of the bird cage for suspending such from a suitable support.

Bars 94, as is conventional may be provided on which the birds can perch. A foraminous covering about the bars 68 may be provided as necessary. Hand holds 81 are provided for more easily handling the closure plates 80.

Since from the foregoing, the construction and advantages of this bird cage are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. A bird cage comprising a bottom plate having a peripreral supporting base secured thereto and downwardly extending therefrom, opposed side and end walls attached to said bottom plate and extending upwardly therefrom, guide flanges secured to said side walls and extending outwardly therefrom, a drawboard slidably removably secured on said flanges above said bottom plate, slots in said end walls above said bottom plate, said drawboard being removable through one of said slots, an arcuate substantially semi-cylindrical tray secured to said base between said end walls, and a roll of disposable material seated in said tray, said roll having a free end extending through said slots and guided between said flanges and said bottom plate.

2. A bird cage comprising a bottom plate having a peripheral supporting base secured thereto and downwardly extending therefrom, opposed side and end walls attached to said bottom plate and extending upwardly therefrom, guide flanges secured to said side walls and extending outwardly therefrom, a drawboard slidably removably secured on said flanges above said bottom plate, slots in said end walls above said bottom plate, said drawboard being removable through one of said slots, an arcuate substantially semi-cylindrical tray secured to said base between said end walls, and a roll of disposable material seated in said tray, said roll having a free end extending through said slots and guided between said flanges and said bottom plate, said drawboard being constructed from foraminous material, said tray having an aperture therethrough for access to said roll.

3. A bird cage comprising a bottom plate having a peripheral supporting base secured thereto and downwardly extending therefrom, opposed side and end walls attached to said bottom plate and extending upwardly therefrom, guide flanges secured to said side walls and extending outwardly therefrom, a drawboard slidably removably secured on said flanges above said bottom plate, slots in said end walls above said bottom plate, said drawboard being removable through one of said slots, an arcuate substantially semi-cylindrical tray secured to said base between said end walls, and a roll of disposable material seated in said tray, said roll having a free end extending through said slots and guided between said flanges and said bottom plate, one end of said bottom plate being arcuate in shape forming an arcuate guide for said disposable material, and a hinged plate hingedly secured to one of said end walls and overlying the said one of said slots, said plate having an edge for cutting said free end of said roll of material.

References Cited in the file of this patent

UNITED STATES PATENTS

| | | |
|---|---|---|
| 304,174 | Coleman | Aug. 26, 1884 |
| 1,771,492 | Karlson | July 29, 1930 |
| 1,990,191 | Leindorf | Feb. 5, 1935 |
| 2,061,712 | Martin | Nov. 24, 1936 |
| 2,151,064 | Alexander | Mar. 21, 1939 |
| 2,174,004 | Markey | Sept. 26, 1939 |
| 2,189,449 | Morris | Feb. 6, 1940 |
| 2,436,095 | Brossia | Feb. 17, 1948 |